United States Patent
Chang et al.

(10) Patent No.: US 10,212,329 B2
(45) Date of Patent: Feb. 19, 2019

(54) SYNCHRONIZATION SYSTEM AND METHOD THEREOF

(71) Applicant: Shanghai Xiaoyi Technology Co., Ltd., Shanghai (CN)

(72) Inventors: Xiangang Chang, Shanghai (CN); Baoqi Wang, Shanghai (CN); Kongqiao Wang, Shanghai (CN); Chao He, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/151,876

(22) Filed: May 11, 2016

(65) Prior Publication Data
US 2017/0289426 A1    Oct. 5, 2017

(30) Foreign Application Priority Data
Apr. 5, 2016    (CN) .......................... 2016 1 0209558

(51) Int. Cl.
*H04N 5/232* (2006.01)
*H04N 5/247* (2006.01)
*H04N 7/18* (2006.01)

(52) U.S. Cl.
CPC ......... *H04N 5/23206* (2013.01); *H04N 5/247* (2013.01); *H04N 7/181* (2013.01)

(58) Field of Classification Search
CPC ........... H04N 5/23203; H04N 5/23206; H04N 5/247; H04W 56/00–56/0095
See application file for complete search history.

(56) References Cited

U.S. PATENT DOCUMENTS

| | | | |
|---|---|---|---|
| 9,264,598 B1 * | 2/2016 | Baldwin | ............ H04N 5/23203 |
| 2002/0118958 A1 | 8/2002 | Ishikawa et al. | |
| 2002/0135682 A1 | 9/2002 | Oka et al. | |
| 2009/0274326 A1 | 11/2009 | Jia et al. | |
| 2011/0157389 A1 * | 6/2011 | McClellan | ............. H04N 5/232 348/222.1 |
| 2012/0249806 A1 * | 10/2012 | Gong | ..................... H04N 5/247 348/207.1 |
| 2013/0128052 A1 * | 5/2013 | Catrein | .................. H04N 5/232 348/159 |
| 2016/0021292 A1 * | 1/2016 | Zhang | ................ H04N 5/23206 348/211.2 |
| 2016/0261807 A1 * | 9/2016 | Seshadrinathan | .... H04N 5/2258 |

FOREIGN PATENT DOCUMENTS

| | | |
|---|---|---|
| KR | 10-2014 00017 | 1/2014 |
| WO | WO 2011/060809 A1 | 5/2011 |

OTHER PUBLICATIONS

Examination Report in counterpart European Patent Application No. 17165135.9 dated Oct. 31, 2018.

\* cited by examiner

*Primary Examiner* — Paul M Berardesca
(74) *Attorney, Agent, or Firm* — Finnegan, Henderson, Farabow, Garrett & Dunner, LLP

(57) ABSTRACT

System and method for synchronizing a plurality of devices are disclosed. According to certain embodiments, a synchronization method includes transmitting, at a first point in time, a first signal for a device to initiate a first operation. The method also includes transmitting, at a second point in time, a second signal for a device to initiate a second operation. The first signal and the second signal indicate a difference between the first point in time and the second point in time.

16 Claims, 7 Drawing Sheets

SYNCHRONIZATION SYSTEM AND METHOD THEREOF

CROSS-REFERENCE TO RELATED APPLICATION

This application is based upon and claims priority from Chinese Patent Application No. 201610209558.X, filed on Apr. 5, 2016, the disclosure of which is expressly incorporated herein by reference in its entirety.

TECHNICAL FIELD

The present disclosure generally relates to imaging systems, and more specifically to systems and methods for synchronizing multiple devices.

BACKGROUND

In many industrial, commercial, and scientific applications, multiple devices operate in a coordinated manner. For example, to create immersive virtual-reality experience, multiple cameras need to collaborate to capture 360 degree panoramic images. An important issue is how to make the shutter in each camera work simultaneously, i.e., synchronizing video capturing at frame level or even frame line level.

FIG. 1 is a schematic diagram illustrating a multi-camera system for capturing images. Referring to FIG. 1, for example, two 4k cameras, i.e., cameras capable of shooting images with a horizontal resolution of about 4,000 pixels, may be aligned to shoot a moving car. Each camera has a field of view that covers a portion of the space to be imaged. Video frames generated respectively by the two cameras may be combined to create the virtual-reality experience. In one possible setup of the multi-camera system, each pixel of the video frame may correspond to a 1-cm distance on the car's moving path. If the car is moving at a speed of 2 cm/ms, then the car passes 2 pixels in 1 ms. Thus, if the shutter operation of one camera lags behind the other camera by 1 ms, the car's position will have about a 2-pixel difference on the two video frames generated by the two cameras respectively. Such pixel difference is usually called the "ghosting" artifact.

The disclosed methods and systems address one or more of the problems listed above.

SUMMARY

Consistent with one disclosed embodiment of the present disclosure, a method is provided for synchronizing a plurality of devices. The method includes transmitting, at a first point in time, a first signal for a device to initiate a first operation. The method also includes transmitting, at a second point in time, a second signal for a device to initiate a second operation. The first signal and the second signal indicate a difference between the first point in time and the second point in time.

Consistent with another disclosed embodiment of the present disclosure, a method is provided for synchronizing a device with other devices. The method includes scanning for signals transmitted by a controller. The signals include a first signal indicating a first time delay, and a second signal indicating a second time delay. The method also includes receiving, at a third point in time, at least one of the first signal and the second signal. The method further includes determining a fourth point in time at which an operation is to be initiated. A difference between the fourth point in time and the third point in time corresponds to the time delay indicated by the received signal.

It is to be understood that both the foregoing general description and the following detailed description are exemplary and explanatory only and are not restrictive of the invention, as claimed.

DESCRIPTION OF DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Synchronization of multiple devices often requires modifications to hardware and software. For example, to eliminate the above-described ghosting artifact, multiple cameras may be connected by wired cables, so as to allow a controller to synchronize the shutter operations of the cameras. Although the cables provide reliable connections, significant modification to the hardware configuration of the cameras is necessary. For example, multiple adapters, connectors, and/or cables may be needed to connect the cameras. Also, when models and manufacturers of the cameras are different, a complicated control system may be needed to accommodate the diverse hardware requirement of each camera.

As described below, in exemplary embodiments consistent with the present disclosure, a controller may be used to transmit a plurality of wireless signals receivable by the multiple cameras. Each wireless signal indicates a time delay for, e.g., triggering a shutter operation.

Figure 1:
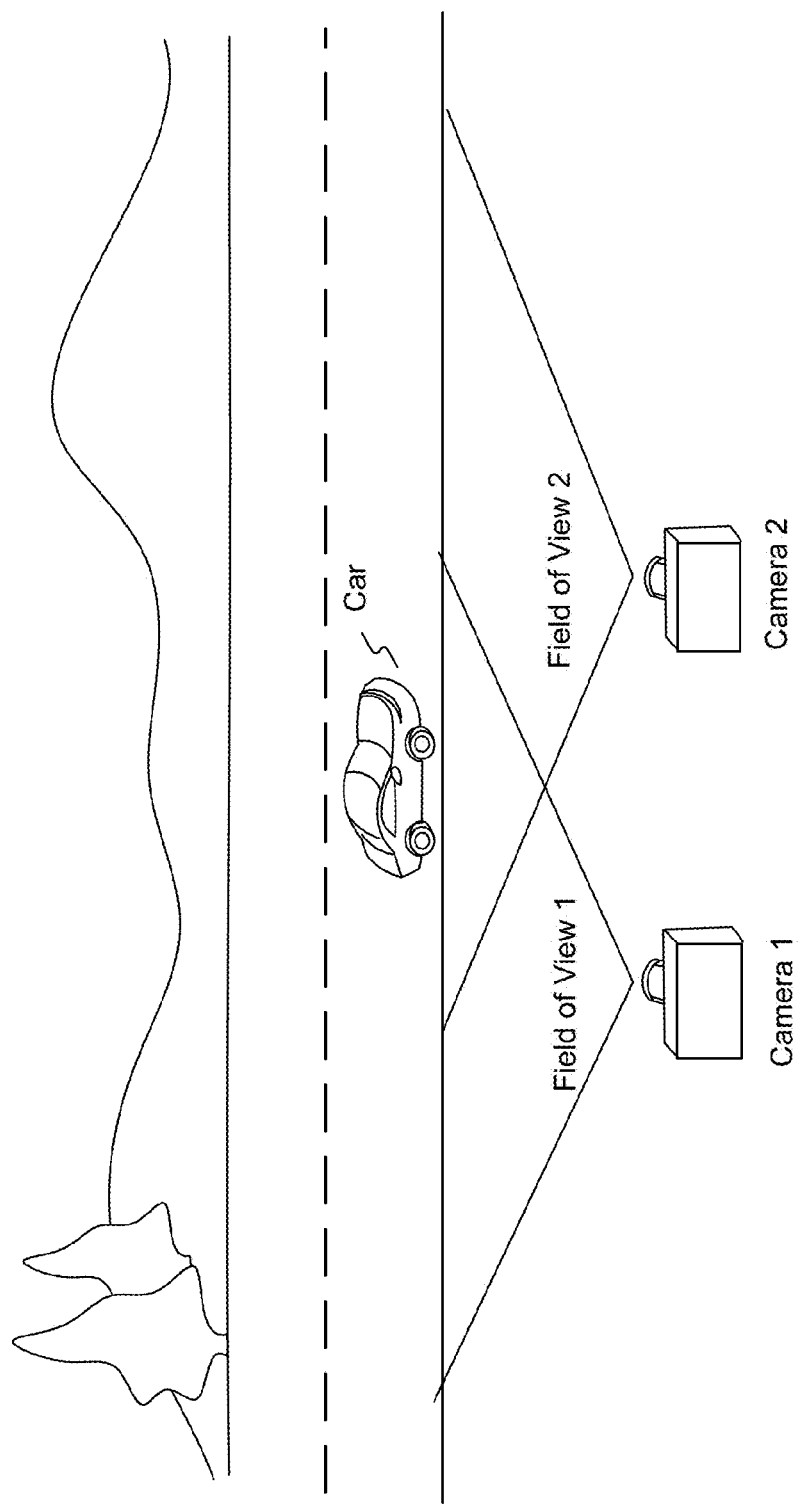
FIG. 1 is a schematic diagram illustrating a multi-camera system for capturing images.
Figure 2:
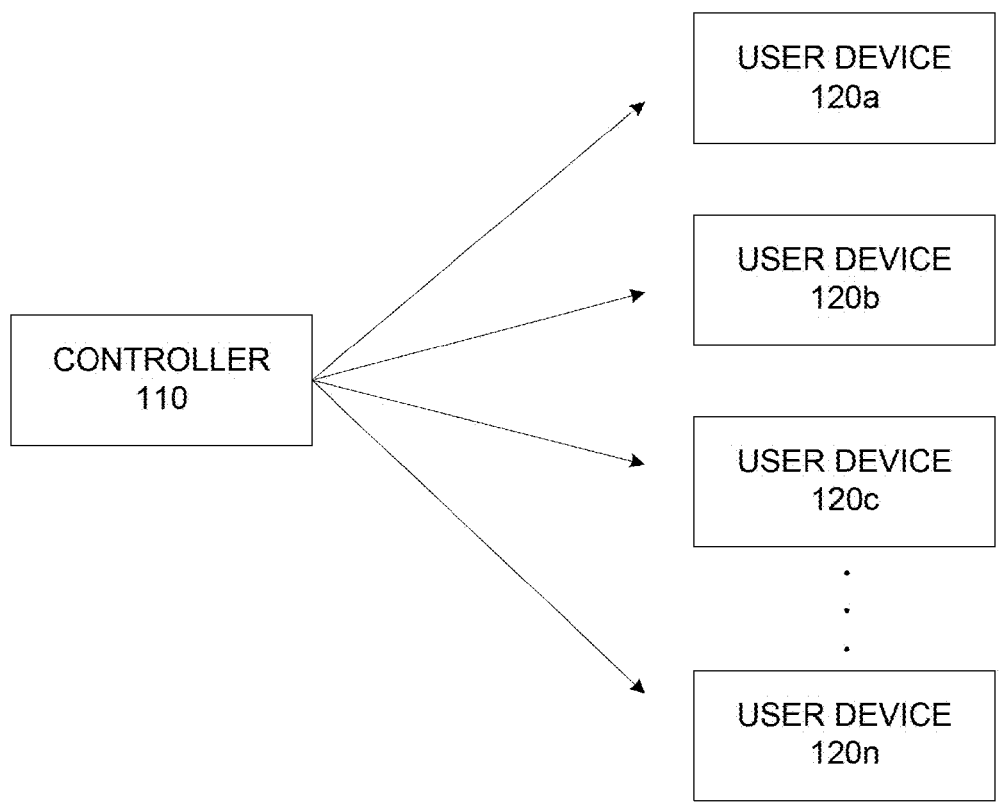
FIG. 2 is a block diagram of a system for synchronizing a plurality of user devices, according to an exemplary embodiment.

FIG. 2 is a block diagram of a system 100 for synchronizing a plurality of user devices, according to an exemplary embodiment. Referring to FIG. 2, system 100 includes a controller 110 and a plurality of user devices 120 (e.g., user devices 120a, 120b, 120c, . . . , and 120n illustrated in FIG. 2).

Controller 110 may be an electronic device capable of controlling each user device 120 to perform certain operations. In particular, controller 110 may be configured to accurately control the timing of the operation in each user device 120, so as to synchronize the operations of some or all of user devices 120. In various embodiments, controller 110 may be a remote control, a mobile phone, a tablet computer, a personal computer, a personal digital assistant (PDA), an MP3 (Moving Picture Experts Group Audio Layer III) player, an MP4 player, etc. Controller 110 may be configured to form wireless and/or wired communications with each user device 120. Controller 110 may include a user interface through which a user may enter various commands and data. For example, the user may use the user interface to trigger some or all of user devices 120 to perform one or more operations simultaneously.

Each user device 120 may be a device with certain computing and/or communication capabilities, such as a smart camera, a smart wearable device (e.g., a wrist band), a smart air conditioner, a smart air purifier, a smart refrigerator, a smart socket, a smart door bell, etc. User devices 120 may be the same or different types of devices. For example, all user devices 120 may be smart cameras that can be controlled by controller 110 to simultaneously shoot a video of an object. For another example, user devices 120 may be different devices such as a smart air conditioner, a smart air purifier, and a smart coffee maker, etc., respectively, and these different user devices 120 may be simultaneously turned on by controller 110. Solely for the purpose of illustration, the following description assumes user devices 120 are smart cameras capable of shooting a video simultaneously.

Each user device 120 may be configured to form wireless and/or wired communications with other devices, including controller 110. For example, each user device 120 may include a built-in Bluetooth® Radio and/or Wi-Fi module for wireless connection. Each user device 120 may further include a Universal Serial Bus (USB) interface for connecting a communication cable.

In exemplary embodiments, controller 110 may generate and transmit a plurality of wireless signals. In one embodiment, controller 110 may periodically transmit the plurality of signals at a predetermined time interval. In another embodiment, controller 110 may transmit the plurality of signals non-periodically.

In exemplary embodiments, controller 110 may transmit the wireless signals in any suitable manner. In one embodiment, controller 110 may transmit the wireless signals via a local network that connects both controller 110 and user devices 120. In another embodiment, controller 110 may broadcast the wireless signals in certain broadcast channels. User devices 120 may scan for and receive the broadcast signals. In yet another embodiment, controller 110 may form a peer-to-peer (P2P) connection with each user device 120 and transmit the wireless signals via the P2P connections.

A wireless signal may be received by one or more user devices 120. In some embodiments, the wireless signal may be received by one or more user devices 120 without a connection being previously established between user device(s) 120 and controller 110.

Each wireless signal may include information for activating an event in user device(s) 120. The event may be an operation to be performed by user device 120, such as shooting a video. For example, the information may indicate a point in time at which user device 120 should start to shoot a video. User device 120 may receive the wireless signal and initiate the video shooting based, at least in part, on the information included in the wireless signal.

Merely by way of example, each user device 120 may scan for the wireless signals and receive a wireless signal including information for shooting a video by user device 120. The information included in the wireless signal may include a time delay (e.g., is) for shooting a video by user device 120. That is, user device 120 may start to capture a video one second after receiving the wireless signal. Consistent with the disclosed embodiments, the information included in each of the plurality of wireless signals may indicate the same point in time for user device 120 to initiate an operation. This way, each user device 120 only needs to receive one wireless signal, in order to be synchronized with other user devices 120. Alternatively, the information included in each of the plurality of wireless signals may indicate multiple different points in time. Each point in time is associated with a particular user device 120. This way, different user devices 120 may be controlled to initiate the operations at the different points in time.

In the context of this disclosure, synchronization does not necessarily mean all devices act at the same time; rather, the devices are synchronized if they act based on a common time reference or in a coordinated manner. Thus, in one aspect, a user device 120 receiving one wireless signal indicating a time delay may choose to activate the event at the time that is delayed from the current time by the amount of the time delay. Alternatively, the device may choose to activate the event at another time based on the time delay indicated in the received wireless signal. For example, the user may wish for a first camera to capture an image or start to shoot a video a few milliseconds before a second camera to create certain special effects. In that case, the second camera may trigger the event, i.e., opening the shutter, with a delay that is a few milliseconds longer than the indicated time delay.

In exemplary embodiments, the wireless signals generated and transmitted by controller 110 may be Bluetooth®, Near Field Communication (NFC), or 802.14 (Zigbee) signals. Other wireless communication protocol used to generate and transmit wireless signals for synchronizing user devices 120 are also contemplated.

For illustrative purpose only, the following descriptions assume the wireless signals are generated and transmitted using the Bluetooth® Low Energy (BLE) technology. However, the principles and implementations of the present disclosure may also be applied to other communication technologies.

A detailed explanation of BLE technology may be found in the Bluetooth® Low Energy Technology Specification version 4.1 and 4.0 and other related BLE specifications. The BLE technology may support very short data packets (for example, 8 octets minimum up to 27 octets maximum) that are transferred at, for example 1 Mbps. The BLE connections may use advanced sniff sub-rating to enable the devices to exchange messages at a low frequency, so as to achieve ultra-low duty cycles. The BLE technology also may use the adaptive frequency hopping, common to all versions of Bluetooth® technology, to minimize interference from other technologies in the 2.4 GHz ISM Band (Industrial, Scientific, and Medical radio Band). The BLE technology may enable efficient multi-path benefits that increase the link budgets (i.e., reduce the propagation loss of signals) and range. The BLE technology can also support connection setup and data transfer as low as 3 ms, allowing an application to form a connection and then transfer authenticated data in few milliseconds for a short communication burst before quickly tearing down the connection. Moreover, increased modulation index provides a possible range for BLE technology of over 100 meters. The BLE technology may use a 24-bit cyclic redundancy check (CRC) on packets to ensure the maximum robustness against interference. The BLE technology may include full AES-128 (128-bit Advanced Encryption Standard) encryption using continuity check message (CCM) to provide encryption and authentication of data packets. The BLE technology may be optimized for one-to-one connections while allowing one-to-many connections using, for example, a star topology.

Figure 3:
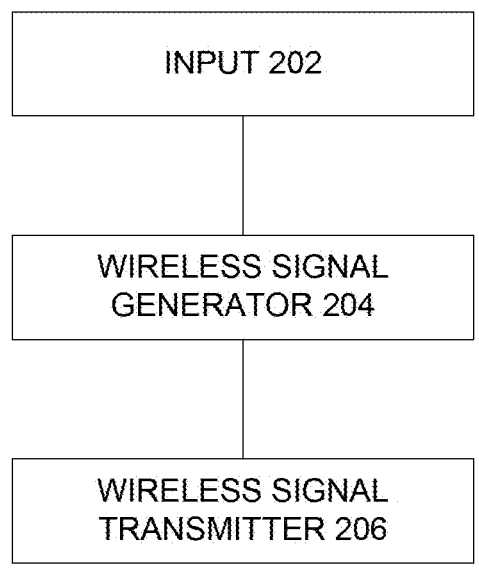
FIG. 3 is a block diagram of a controller for synchronizing a plurality of user devices, according to an exemplary embodiment.

FIG. 3 is a block diagram of controller 110 for synchronizing a plurality of user devices, according to an exemplary embodiment. Referring to FIG. 3, controller 110 may include an input 202, a wireless signal generator 204, and a wireless signal transmitter 206.

Input 202 may be configured to receive one or more inputs from a user to generate wireless signals for synchronizing user devices 120. In some embodiments, input 202 may be a button, a touch pad, a key pad, a motion sensor, or the like, or a combination thereof. Merely by way of example, a user may push a button (part of input 202) on controller 110, which may then start a process for generating and transmitting one or more wireless signals as described in the present disclosure.

Figure 4:
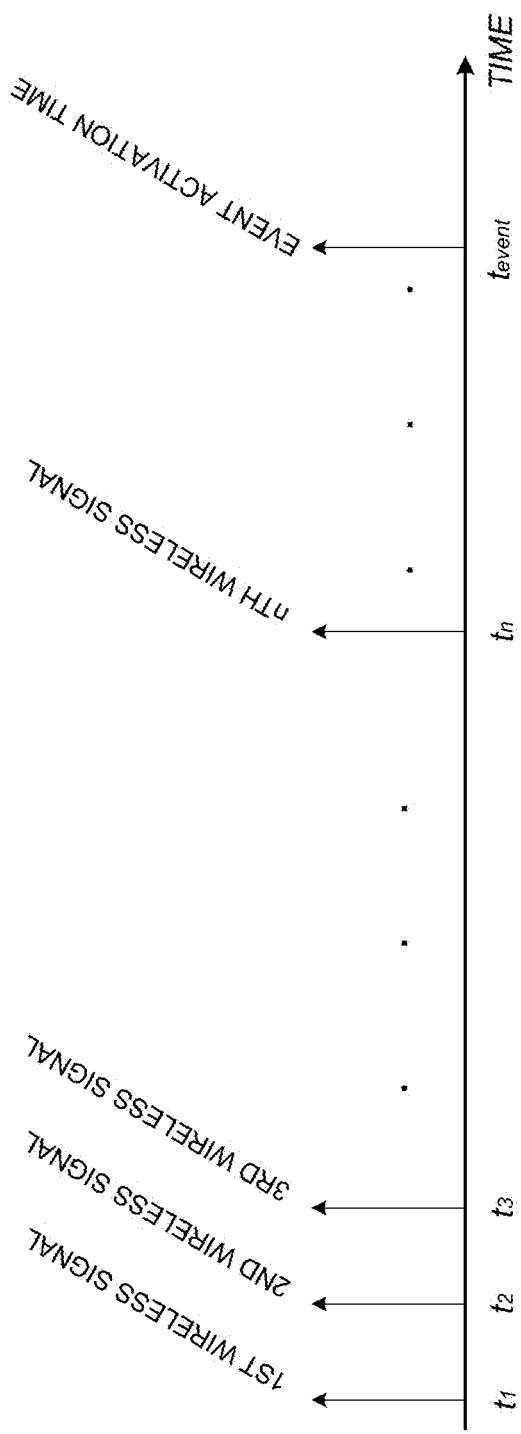
FIG. 4 is a schematic diagram illustrating a plurality of wireless signals generated by the controller in FIG. 3, according to an exemplary embodiment.

In some embodiments, once input 202 receives an input from the user, wireless signal generator 204 may generate a plurality of wireless signals over a period of time. FIG. 4 is a schematic diagram illustrating a plurality of wireless signals generated by controller 110, according to an exemplary embodiment. As illustrated in FIG. 4, wireless signal generator 204 may generate (and/or wireless signal transmitter 206 may transmit) a first wireless signal at time point $t_1$, a second wireless signal at $t_2$, a third wireless signal at $t_3$, . . . , and a n-th wireless signal at $t_n$, and so on. The difference between the transmitting time points of two successive wireless signals may be a constant. In other words, $t_2-t_1=t_3-t_2=\ldots=t_n-t_{n-1}$. Merely by way of example, wireless signal generator 204 may generate 10 wireless signals over a period of 100 ms with a 10 ms interval. In some embodiments, the range of the number of wireless signals generated may be 1-10,000. In other embodiments, the number of wireless signals generated may be restricted to a subrange of 1-10, 20-100, 100-500, 500-1,000, or 1,000-10,000. In some embodiments, the range of the period of time over which wireless signals are generated may be 1 ms to 10 s. In other embodiments, the period of time may be restricted to a subrange of 1-10 ms, 10-20 ms, 20-50 ms, 50-100 ms, 100-1,000 ms, 1-2 s, 2-5 s, or 5-10 s. In some embodiments, parameters for generating and transmitting wireless signals (e.g., the number of wireless signals generated and transmitted and/or the period of time over which the wireless signals are transmitted) may be adjustable by a user through, for example, controller 110.

In some embodiments, a wireless signal may include timing information for activating an event at user device 120. Referring to FIG. 4, $t_{event}$ refers to a point in time at which a user device 120 initiates the event. Controller 110 may generate (and transmit) a first wireless signal at $t_1$. The first wireless signal may include a first time delay $t_{event}-t_1$ for a user device 120 to initiate a first operation (e.g., starting to shoot a video) after receiving the first wireless signal. For example, the first time delay $t_{event}-t_1$ may be 500 ms, instructing a user device 120 receiving the first wireless signal to initiate an operation in 500 ms. Controller 110 may also generate and transmit a second wireless signal at $t_2$. The second wireless signal may include a second time delay $t_{event}-t_2$ for a user device 120 to initiate a second operation after receiving the second wireless signal. Continuing from the above example, if the wireless signals are generated and transmitted at a fixed time interval of 20 ms, i.e., $t_2-t_1=20$ ms, the second time delay $t_{event}-t_2$ is 480 ms, instructing a user device 120 receiving the second wireless signal to initiate the second operation in 480 ms. In a similar manner, the fifth wireless signal may include a fifth time delay $t_{event}-t_5=400$ ms, and the n-th wireless signal may include a n-th time delay $t_{event}-t_n=t_{event}-n(t_2-t_1)$. Accordingly, all the wireless signals may point to the same activation time $t_{event}$.

In practice, different wireless signals, such as the first wireless signal and the second wireless signal, may be received by the same user device 120 or different user device 120. Some wireless signals may be received by multiple user devices 120, while some other wireless signal may fail to be received by any user device 120. However, consistent with the present disclosure, as long as each user device 120 receives one of the plurality of wireless signals, the operations of all the user devices 120 may be synchronized. Moreover, the operation of each user device 120 to be synchronized may be the same or different. For example, all user devices 120 may be synchronized to shoot a video of a moving car at $t_{event}$. For another example, user device 120a may be controlled to start shooting the video of the moving car at $t_{event}$, while user device 120b may be controlled to start shooting photos of a truck behind the car at $t_{event}$.

In the above description, the timing information carried by each wireless signal is presented in the form of a time delay after the point in time when a user device 120 receives the wireless signal. However, it is contemplated that the timing information may be presented in any suitable forms. In one embodiment, each wireless signal may include the same activation time $t_{event}$ and a different offset time $t_{offset}$. Specifically, the first wireless signal may include an activation time $t_{event}$, indicated as a time delay, e.g., 500 ms, after a user device 120 receiving the first wireless signal. The second wireless signal may include the same activation time $t_{event}$, and an offset time $t_{offset}$, for offsetting the time difference between the transmitting time points of the first and second wireless signals. For example, user device 120a may receive the first wireless signal, which includes an activation time $t_{event}=500$ ms, and user device 120b may receive the second wireless signal, which includes the same event activation time $t_{event}=500$ ms, and an offset time $t_{offset}$, of 20 ms (i.e., $t_2-t_1$, which is the difference between the transmitting time points of the first and second wireless signals). This way, user device 120b may active an operation $t_{event}-t_{offset}=(500-20)=480$ ms after receiving the second wireless signal. Accordingly, the n-th wireless signal may include the same event activation time $t_{event}$ of 500 ms, and a different offset time $t_{offset}=t_n-t_1$. As such, a user device 120 that receives the n-th wireless signal may determine the corresponding time delay for initiating an operation after receiving the n-th wireless signal.

In some embodiments, each wireless signal may also include information configured to identify controller 110 and the operations of user devices 120 to be synchronized. In one embodiment, each wireless signal may include information related to the identity of controller 110. User devices 120 may only be synchronized by a pre-authorized controller 110. Each user device 120 may determine whether a received wireless signal is transmitted by an authorized controller 110 by checking the identity of controller 110 included in the wireless signal. In one synchronization scenario, there are provided two controllers 110 and two groups of user devices 120. The first group of user devices 120 may be paired with and only be controlled by a first controller 110, and the second group of user devices 120 may be paired with and only be controlled by the second controller 110. The two controllers 110 may transmit signals carrying the respective controller identities. If the controller identity in a wireless signal does not match the identity of the first controller, each of the first group of user devices 120 may ignore the wireless signal.

In one embodiment, each wireless signal may include information related to the operations of user devices 120 to be synchronized. Each type of operation may be coded with a unique identifier (UID). For example, a first UID may be used for identifying the operation of opening a shutter. A second UID may be used for identifying the operation of turning on a camera flash. A third UID may correspond to the initiation of shooting a video. And a fourth UID may correspond to the initiation of shooting photos. By deciphering the UID included in a received wireless signal, user device 120 may determine the operation to be synchronized.

Wireless signal generator 204 may include one or more processors to execute instructions stored on a memory, to generate the wireless signals. Moreover, wireless signal generator 204 may include one or more modules which facilitate the interaction between wireless signal generator 204 and other components, including input 202 and wireless signal transmitter 206. In some embodiments, wireless signal generator 204 may be implemented with one or more application-specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described in the present disclosure.

Wireless signal generator 204 may also include one or more memories configured to store the instructions and data for generating the wireless signals. The memories may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Wireless signal transmitter 206 may be configured to send the wireless signals to user devices 120. Wireless signal transmitter 206 can access a wireless network based on a communication standard, such as WiFi, 2G, 3G, 4G, 5G, LTE, or a combination thereof. In one exemplary embodiment, wireless signal transmitter 206 transmits a broadcast signal or broadcast associated information to an external broadcast management system via a broadcast channel. In one exemplary embodiment, wireless signal transmitter 206 further includes a NFC module to facilitate short-range communications. For example, the NFC module may be implemented based on a Near Field Communication (NFC) technology, radio frequency identification (RFID) technology, an infrared data association (IrDA) technology, an ultra-wideband (UWB) technology, a Bluetooth® technology, and other technologies. In particular, consistent with the disclosed embodiments, wireless signal transmitter 206 can send the wireless signals to user devices 120 using the BLE technology. Wireless signal transmitter 206 may include a Bluetooth® radio capable of performing low-energy secure wireless communications with user devices 120 using the BLE technology.

In one embodiment, controller 110 may send the wireless signals to user devices 120 using BLE advertisement. The BLE advertisement allows controller 110 to send broadcast signals to user devices 120 without forming connections with user devices 120. Specifically, wireless signal generator 204 may generate the wireless signals as advertising packets. Moreover, wireless signal transmitter 206 may transmit the advertising packets through one or more predetermined advertising channels. User devices 120 may listen to these predetermined channels for the advertising packets. The advertising packets may be generated and broadcast at a fixed time interval, for example, 20 ms. Each advertising packet may include the time information for synchronizing the operations of user devices 120. Each advertising packet may also include the information used for identifying controller 110 and the operations to be synchronized. Typically, an advertising packet may have a 31-byte payload, large enough to carry all the timing information and the identity information. With the BLE advertisement, the Bluetooth® function of controller 110 only needs to be woken up when the user triggers the synchronization function of controller 110. Thus, the BLE advertisement may have a big impact on the power consumption of controller 110.

Figure 5:
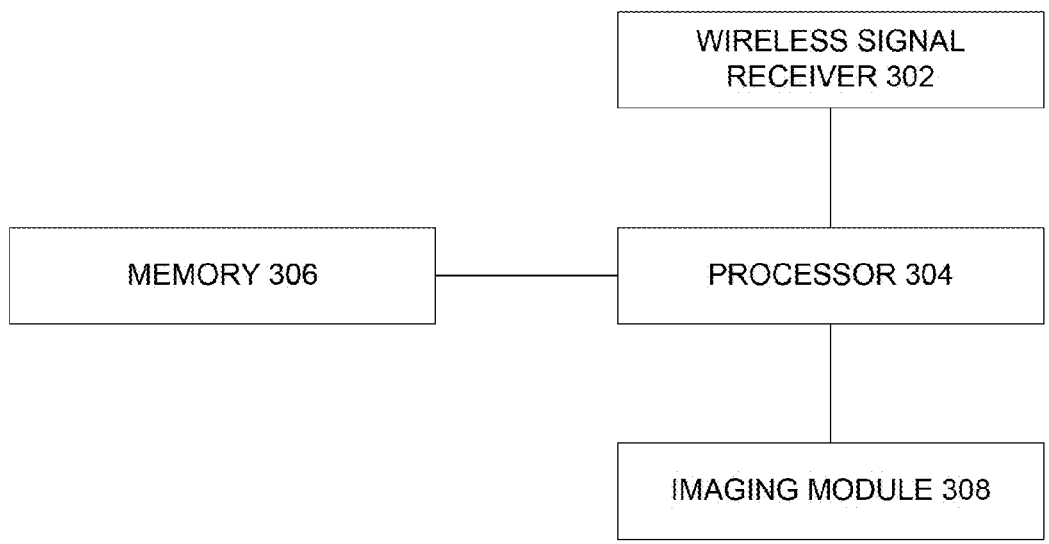
FIG. 5 is a block diagram of a user device in FIG. 2, according to an exemplary embodiment.

FIG. 5 is a block diagram of a user device 120, according to an exemplary embodiment. Referring to FIG. 5, user device 120 (e.g., user device 120a, 120b, 120c, ..., or 120n shown in FIG. 2) may include, among other things, a wireless signal receiver 302, a processor 304, a memory 306, and an imaging module 308.

Wireless signal receiver 302 may be a receiver configured to receive the wireless signals transmitted by controller 110. The wireless signal may be a Bluetooth®, NFC, or 802.14 (Zigbee) signal. In some embodiments, wireless signal receiver 302 may include a Bluetooth® radio configured to scan for and receive BLE advertising packets. Wireless signal receiver 302 may periodically scan the predetermined advertising channels to discover any advertising packets sent by controller 110. In practice, a suitable scanning interval may be selected to both reduce the power consumption and preserve the scanning efficiency. Generally, as the scanning interval increases, it takes longer to discover an advertising packet. However, since each user device 120 only needs to receive one advertising packet to achieve the desired synchronization, the scanning error rate can be effectively reduced.

Processor 304 may execute computer instructions (program code) and performs functions in accordance with techniques described herein. Computer instructions include routines, programs, objects, components, data structures, procedures, modules, and functions, which perform particular functions described herein. For example, processor 304 may analyze the wireless signal received from controller 110 and determine the point in time to trigger certain operation of user device 120. Processor 304 may also determine whether a wireless signal is sent by controller 110 based on the identity information in the wireless signal. Processor 304 may also determine the operation to be synchronized based on the wireless signal. Processor 304 may further control other components of user device 120 to initiate the operation at the desired activation time $t_{event}$. For example, if the synchronized operation is the initiation of video shooting, processor 304 may open the shutter of user device 120 at $t_{event}$ to start to shoot the video. After the video shooting is initiated, processor 304 may further control the subsequent frame capture according to the respective clock of user device 120.

Memory 306 is configured to store one or more computer programs to be executed by processor 304 to perform exemplary functions disclosed herein. For example, memory 306 is configured to store program(s) executed by processor 304 to analyze the received wireless signals and instruct image sensor 308 to capture a video at the desired activation time $t_{event}$. Memory 306 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Imaging module 408 is in communication with processor 304 and configured to shoot videos and/or photos. Imaging module 308 may include a shutter whose movement, i.e., open and close, may be controlled by processor 304.

Figure 6:
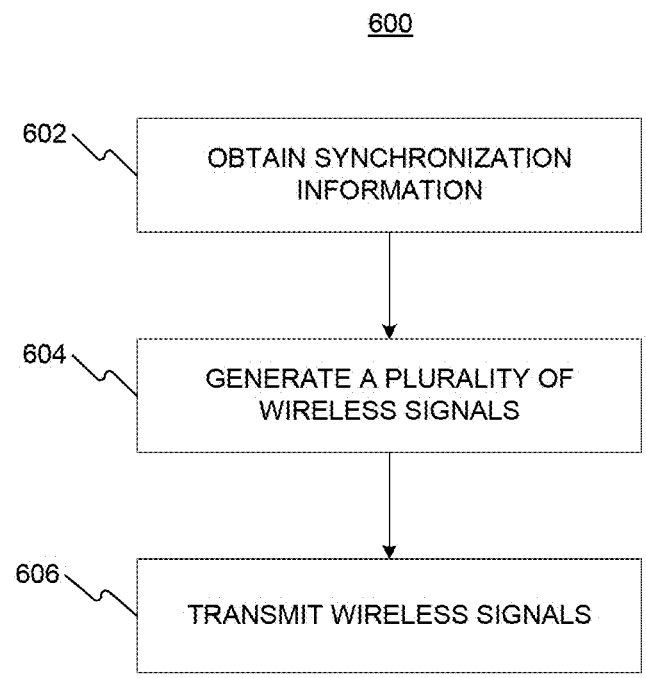
FIG. 6 is a flowchart of a process for transmitting a plurality of wireless signals, according to an exemplary embodiment.

FIG. 6 is a flowchart of a process 600 for transmitting a plurality of wireless signals, according to an exemplary embodiment. For example, process 600 may be used in controller 110. Referring to FIG. 6, process 600 may include the following steps.

In step 602, controller 110 may obtain the synchronization information, after receiving a user input for synchronizing the operations of a plurality of user devices 120. For example, controller 110 may be configured as a remote control with a button for synchronizing the operations of user devices 120. The synchronized operation may be a predetermined operation of user devices 120, such as initiating video shooting. In one embodiment, controller 110 may also have a user interface, such as a touch screen, to display a list of candidate operations and allow the user to select the operation to be synchronized. After receiving the user input, controller 110 may obtain the synchronization information. The synchronization information may include, but not limited to: the time for initiating the operation in user devices 120, the periodicity of generating and transmitting the wireless signals, the identity of controller 110, and the type of the operation to be initiated. Such information may be set and adjusted by the user through the user interface of controller 110.

In step 604, controller 110 may generate a plurality of wireless signals based on the obtained synchronization information. Controller 110 may encode the synchronization information and insert the encoded information in each wireless signal. For example, each wireless signal may correspond to a different time delay for initiating the synchronized operation. Accordingly, controller 110 may determine the time delay and incorporate the time delay in the respective wireless signal.

In step 606, controller 110 may transmit the wireless signals. In the case that the BLE technology is used, controller 110 may periodically broadcast the wireless signals in the form of advertising packets. The broadcast of the advertising packets does not require a connection to be formed between controller 110 and each user device 120. Also, unlike WiFi, the BLE advertisement does not require a pre-existing network infrastructure, and can bypass Internet service providers and wireless accessing points. Thus, the BLE advertisement can achieve fast data transmission and have better real-time performance than WiFi.

Figure 7:
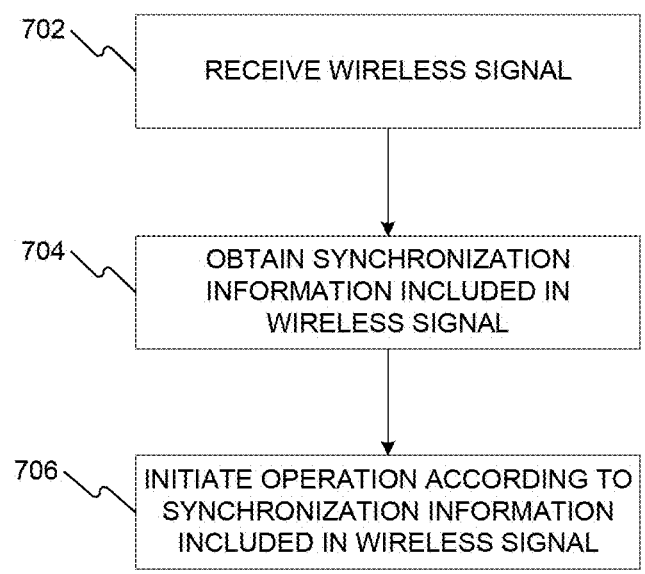
FIG. 7 is a flowchart of a process for initiating a synchronized operation, according to an exemplary embodiment.

FIG. 7 is a flowchart of a process 700 for initiating a synchronized operation, according to an exemplary embodiment. For example, process 700 may be used in user device 120 (e.g., user device 120a, 120b, 120c, . . . , or 120n shown in FIG. 2). Referring to FIG. 7, process 700 may include the following steps.

In step 702, user device 120 may receive a wireless signal. For example, user device 120 may be configured to periodically scan for the wireless signals. As described above, to achieve the desired synchronization, a user device 120 only needs to receive one of the plurality of wireless signals. Therefore, user device 120 may prolong the intervals between two successive scans (i.e., reducing the power consumption), while still maintaining a low scanning error rate. Moreover, a user may conveniently include or exclude a user device 120 from the synchronization. For example, if the user does not want to synchronize user device 120c with other user devices 120, the user may turn off the communication capability, e.g., Bluetooth® function, of user device 120c to prevent it from receiving any wireless signals.

In step 704, user device 120 may obtain the synchronization information included in the received wireless signal. For example, user device 120 may determine whether the received wireless signal is sent from an authorized controller. If not, user device 120 may discard the wireless signal. If yes, user device 120 may further determine the time delay for initiating the synchronized operation. User device 120 may also obtain from the wireless signal the type of the operation to be synchronized.

In step 706, user device 120 may initiate the synchronized operation according to the obtained synchronization information. For example, the synchronized operation may be initiating the shooting of a video. To improve the response speed of user device 120 to the wireless signals, each user device 120 may be preset in a video-capturing mode, so as to reduce the system load of user device 120. After the time delay (determined in step 704) has elapsed, user device 120 may open the shutter to start video shooting. In exemplary embodiments, with each of the plurality of user devices 120 performing process 600, the shutter synchronization may be achieved.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method implemented by a controller for synchronizing a plurality of devices, comprising:
receiving, via a user interface of the controller, a user input for triggering an operation by the plurality of devices;
in response to receiving the user input:
broadcasting, by a wireless signal transmitter at a first point in time, a first signal in a form of Bluetooth® advertising packets to the plurality of devices to initiate the operation by the plurality of devices, the first signal carrying information including an operation activation time, a first offset time, and an identifier of the controller, a difference between the operation activation time and the first offset time corresponding to a point of time at which the operation is initiated; and broadcasting, by the wireless signal transmitter at a second point in time, a second signal in the form of Bluetooth® advertising packets to the plurality of devices to initiate the operation, the second signal carrying information including the operation activation time, a second offset time, and the identifier of the controller, a difference between the operation activation time and the second offset time corresponding to the point of time at which the operation is initiated;

wherein a difference between the first offset time and the second offset time is equal to a difference between the first point in time and the second point in time, and wherein the plurality of devices are paired with the controller in advance and configured to recognize the identifier of the controller.

2. The method of claim 1, wherein
the first point in time and the second point in time are separated by a predetermined time interval,
wherein each of the first and second signals includes an index corresponding to an order in which the respective signal is broadcast.

3. The method of claim 1, wherein each signal includes a unique identifier configured to identify the operation to be initiated by a device receiving the signal.

4. A controller for controlling a plurality of devices, comprising:
a signal generator configured to:
receive, from a user interface of the controller, a user input for triggering an operation by the plurality of devices;
in response to receiving the user input;
generate a first signal for a device to initiate the operation, the first signal carrying information including an operation activation time, a first offset time, and an identifier of the controller, a difference between the operation activation time and the first offset time corresponding to a point of time at which the operation is initiated; and
generate a second signal for a device to initiate the operation, the second signal carrying information including the operation activation time, a second offset time, and the identifier of the controller, a difference between the operation activation time and the second offset time corresponding to the point of time at which the operation is initiated; and
a wireless signal transmitter configured to:
broadcast the first signal in a form of Bluetooth® advertising packets to the plurality of devices at a first point in time; and
broadcast the second signal in the form of Bluetooth® advertising packets to the plurality of devices at a second point in time;
wherein a difference between the first offset time and the second offset time is equal to a difference between the first point in time and the second point in time, and wherein the plurality of devices are paired with the controller in advance and configured to recognize the identifier of the controller.

5. The controller of claim 4, wherein
the first point in time and the second point in time are separated by a predetermined time interval,
wherein each of the first and second signals includes an index corresponding to an order in which the respective signal is broadcast.

6. The controller of claim 4, wherein the signal generator includes at least one of:
a circuit configured to generate the first and second signals; or
a processor configured to execute instructions, stored in a memory, for generating the first and second signals.

7. The controller of claim 4, wherein the signal transmitter is a Bluetooth® radio.

8. The controller of claim 4, wherein each signal includes a unique identifier configured to identify the operation to be initiated by a device receiving the signal.

9. A synchronization method performed by a computing device, comprising:
scanning, by a wireless signal receiver of the computing device, for signals broadcast by a controller, the signals being in a form of Bluetooth® advertising packets and including at least:
a first signal broadcast by the controller at a first point in time, the first signal carrying information including an operation activation time, a first offset time, and an identifier of the controller; and
a second signal broadcast by the controller at a second point in time, the second signal carrying information including the operation activation time, a second offset time, and the identifier of the controller,
a difference between the first offset time and the second offset time being equal to a difference between the first point in time and the second point in time;
receiving, by the wireless signal receiver at a third point in time, at least one of the first signal and the second signal;
determining, by a processor of the computing device, whether the received signal is broadcast by an authorized controller, based on the identifier of the controller included in the received signal;
after determining that the received signal is broadcast by an authorized controller, determining, by the processor, a fourth point in time at which an operation is to be initiated, a difference between the fourth point in time and the third point in time being equal to a difference between the operation activation time and the offset time included in the received signal; and
controlling, by the processor, the computing device to initiate the operation at the fourth point in time;
wherein the computing device is paired with the controller in advance.

10. The method of claim 9, wherein:
the first and second signals are broadcast at a predetermined time interval; and
each of the first signal or the second signal includes an index corresponding to an order in which the respective signal is broadcast;
wherein determining the fourth point in time further includes:
determining the fourth point in time based on the index of the received signal.

11. The method of claim 9, wherein scanning for the signals broadcast by the controller further comprises:

scanning for the Bluetooth® advertising packets at a predetermined time interval.

12. The method of claim 9, wherein the received signal includes a unique identifier, wherein the method further comprises:
    determining, based on the unique identifier, the operation to be initiated.

13. A device, comprising:
    a wireless signal receiver configured to:
        scan for signals broadcast by a controller, the signals being in a form of Bluetooth® advertising packets and including at least:
            a first signal broadcast by the controller at a first point in time, the first signal carrying information including an operation activation time, a first offset time, and an identifier of the controller; and
            a second signal broadcast by the controller at a second point in time, the second signal carrying information including the operation activation time, a second offset time, and the identifier of the controller,
            a difference between the first offset time and the second offset time being equal to a difference between the first point in time and the second point in time; and
        receive, at a third point in time, at least one of the first signal and the second signal; and
    a processor in communication with the wireless signal receiver, the processor being configured to:
        determine whether the received signal is broadcast by an authorized controller, based on the identifier of the controller included in the received signal;
        after determining that the received signal is broadcast by an authorized controller, determine a fourth point in time at which an operation of the device is to be initiated, a difference between the fourth point in time and the third point in time being equal to a difference between the operation activation time and the offset time included in the received signal; and
        control the device to initiate the operation at the fourth point in time;
    wherein the computing device is paired with the controller in advance.

14. The device of claim 13, wherein:
    the first and second signals are broadcast at a predetermined time interval; and
    each of the first signal or the second signal includes an index corresponding to an order in which the respective signal is broadcast;
    wherein the processor is further configured to:
        determine the fourth point in time based on the index of the received signal.

15. The device of claim 13, wherein the signal receiver includes:
    a Bluetooth® radio configured to scan for and receive the Bluetooth® advertising packets.

16. The device of claim 13, wherein the received signal includes a unique identifier, wherein the processor is further configured to:
    determine, based on the unique identifier, the operation to be initiated.

* * * * *